(12) United States Patent
Zeller et al.

(10) Patent No.: US 10,240,544 B2
(45) Date of Patent: Mar. 26, 2019

(54) ADAPTIVE CONTROLLER USING UNMEASURED OPERATING PARAMETER

(71) Applicants: Rolls-Royce Corporation, Indianapolis, IN (US); Rolls-Royce North American Technologies, Inc., Indianapolis, IN (US)

(72) Inventors: Robert J. Zeller, Noblesville, IN (US); Curtis Harvey Cline, Brownsburg, IN (US); Michael P. Dougherty, Indianapolis, IN (US); Richard Joseph Skertic, Carmel, IN (US)

(73) Assignees: Rolls-Royce Corporation, Indianapolis, IN (US); Rolls-Royce North American Technologies, Inc., Indianapolis, IN (US)

(*) Notice: Subject to any disclaimer, the term of this patent is extended or adjusted under 35 U.S.C. 154(b) by 42 days.

(21) Appl. No.: 15/336,534

(22) Filed: Oct. 27, 2016

(65) Prior Publication Data

US 2018/0119628 A1 May 3, 2018

(51) Int. Cl.
*F02D 41/14* (2006.01)
*F02D 41/26* (2006.01)
(Continued)

(52) U.S. Cl.
CPC .......... *F02D 41/1402* (2013.01); *F02C 9/00* (2013.01); *F02D 41/1406* (2013.01);
(Continued)

(58) Field of Classification Search
CPC .. F02D 41/1402; F02D 41/1406; F02D 41/26; F02D 2041/1433; G05B 13/041
See application file for complete search history.

(56) References Cited

U.S. PATENT DOCUMENTS

| 4,947,334 A | 8/1990 | Massey et al. |
| 5,023,793 A | 6/1991 | Schneider et al. |

(Continued)

OTHER PUBLICATIONS

Gibson, Closed-Loop Reference Model Adaptive Control: with Application to Very Flexible Aircraft, Massachusetts Institute of Technology, Feb. 2014, 152 pgs.
(Continued)

*Primary Examiner* — Ramesh B Patel
(74) *Attorney, Agent, or Firm* — Shumaker & Sieffert, P.A.

(57) ABSTRACT

The disclosure includes a system that includes a real-time engine model module and an adaptive control module. The real-time engine model module is configured to determine an engine parameter estimate signal based on at least one feedback signal indicative of an operating parameter of an engine. The adaptive control module is configured to receive a power request signal and receive, from the real real-time engine model module, the engine parameter estimate signal. The adaptive control module is further configured to determine a power demand signal based on the power request signal and the engine parameter estimate signal, wherein the adaptive control module is configured to determine the power demand signal based on the power request signal using a set of control laws. The adaptive control module is further configured to output the power demand signal to control at least one component of the engine.

20 Claims, 5 Drawing Sheets

$C_{adp}$ = adaptation mode signal
$C_{st}$ = system state signal
$C_{trm}$ = trim signal
$C_{crd}$ = system coordination signal
$P_{op}$ = operational mode signal
$P_{req}$ = power request signal
$R_{dmd}$ = demand signal
$X_{act}$ = actuator signal
$X_{eng}$ = engine state trajectory signal
$X_{est}$ = engine parameter estimate signal
$V_{inp}$ = engine input

(51) Int. Cl.
G05B 13/04 (2006.01)
F02C 9/00 (2006.01)

(52) U.S. Cl.
CPC .... *G05B 13/041* (2013.01); *F02D 2041/1433* (2013.01); *F05D 2260/821* (2013.01)

(56) References Cited

U.S. PATENT DOCUMENTS

| | | | |
|---|---|---|---|
| 5,078,345 A | 1/1992 | De Vries et al. | |
| 5,094,213 A * | 3/1992 | Dudek | F02D 37/00 |
| | | | 123/339.27 |
| 5,105,372 A | 4/1992 | Provost et al. | |
| 5,189,620 A | 2/1993 | Parsons et al. | |
| 5,305,595 A | 4/1994 | Curran et al. | |
| 5,315,819 A | 5/1994 | Page et al. | |
| 5,732,676 A * | 3/1998 | Weisman | B60K 31/04 |
| | | | 123/436 |
| 6,729,139 B2 | 5/2004 | Desai et al. | |
| 6,748,744 B2 | 6/2004 | Peplow et al. | |
| 6,789,390 B2 | 9/2004 | Hu et al. | |
| 6,823,675 B2 * | 11/2004 | Brunell | F02C 9/00 |
| | | | 60/773 |
| 6,922,389 B1 * | 7/2005 | Lundby | H04W 52/06 |
| | | | 370/209 |
| 6,986,641 B1 | 1/2006 | Desai et al. | |
| 7,219,040 B2 * | 5/2007 | Renou | F02C 9/28 |
| | | | 700/177 |
| 7,406,820 B2 | 8/2008 | Critchley et al. | |
| 7,530,232 B2 | 5/2009 | Certain | |
| 7,742,904 B2 | 6/2010 | Healy et al. | |
| 8,566,000 B2 | 10/2013 | Lickfold et al. | |
| 9,342,060 B2 * | 5/2016 | Fuller | G05B 13/048 |
| 2002/0162317 A1 | 11/2002 | Banaszuk et al. | |
| 2003/0200069 A1 | 10/2003 | Volponi | |
| 2004/0088059 A1 | 5/2004 | Johnson et al. | |
| 2004/0123600 A1 * | 7/2004 | Brunell | F02C 9/00 |
| | | | 60/773 |
| 2004/0176860 A1 | 9/2004 | Hovakimyan et al. | |
| 2005/0193739 A1 | 9/2005 | Brunell et al. | |
| 2007/0027688 A1 | 2/2007 | Kahn | |
| 2007/0073525 A1 | 3/2007 | Healy et al. | |
| 2008/0060341 A1 | 3/2008 | Loisy | |
| 2008/0294305 A1 | 11/2008 | Roesch | |
| 2009/0090817 A1 | 4/2009 | Monka | |
| 2009/0216425 A1 * | 8/2009 | Hay | F02D 41/065 |
| | | | 701/103 |
| 2010/0017093 A1 * | 1/2010 | Mahmood | F01D 11/24 |
| | | | 701/100 |
| 2010/0038158 A1 * | 2/2010 | Whitney | B60K 6/365 |
| | | | 180/65.265 |
| 2010/0057297 A1 | 3/2010 | Itagaki et al. | |
| 2010/0153025 A1 | 6/2010 | Ling et al. | |
| 2010/0162718 A1 | 7/2010 | Bowman | |
| 2010/0241331 A1 | 9/2010 | Duke et al. | |
| 2011/0213507 A1 | 9/2011 | Dooley | |
| 2012/0022838 A1 | 1/2012 | Bacic et al. | |
| 2012/0053735 A1 | 3/2012 | Tessier et al. | |
| 2012/0060505 A1 * | 3/2012 | Fuller | G05B 13/00 |
| | | | 60/773 |
| 2012/0095658 A1 | 4/2012 | Yasui | |
| 2015/0007574 A1 * | 1/2015 | Morgan | F02C 9/28 |
| | | | 60/772 |
| 2015/0267619 A1 | 9/2015 | Khalid | |
| 2016/0208639 A1 | 7/2016 | Cai | |
| 2016/0208717 A1 * | 7/2016 | Cai | F02C 3/10 |

OTHER PUBLICATIONS

Pakmehr et al., Model Reference Adaptive Control of Systems with Gain Scheduled Reference Models, math. OC, Mar. 15, 2014, 33 pgs.
Behbahani et al., "Integrated Model-Based Controls and PHM for Improving Turbine Engine Performance, Reliability, and Cost", 45th AIAA/ASME/SAE/ASEE Joint Propulsion Conference & Exhibit, Aug. 2-5, 2009, 9 pgs.
Panov, "Model-Based Control and Diagnostic Techniques for Operational Improvements of Gas Turbine Engines", Proceedings of 10th European Conference on Turbomachinery Fluid dynamics & Thermodynamics, Apr. 15-19, 2013, 12 pgs.
O'Brien et al., Performance Prediction and Simulation of Gas Turbine Engine Operation, Report of the RTO Applied Vehicle Technology Panel (AVT) Task Group, AVT-018, RTO Technical Report 44,2002 [retrieved from http://ftp.rta.nato.int/public/PubFuiiText/RTO/TRIRTO-TR-044/TR-044-$$ALL.pdf] (pp. 1, 5-1 07).
U.S. Appl. No. 15/336,546, by Curtis Harvey Kline, et al., filed Oct. 27, 2016.
Lavretsky et al., "Robust and Adaptive Control with Aerospace Applications," Springer-Verlag, 2013 (Applicant points out, in accordance with MPEP 609.04(a), that the year of publication, 2013, is sufficiently earlier than the effective U.S. filing date, 2016, so that the particular month of publication is not in issue.) 225 pp.
Richter, "Advanced Control of Turbofan Engines," Springer, 2012, (Applicant points out, in accordance with MPEP 609.04(a), that the year of publication, 2012, is sufficiently earlier than the effective U.S. filing date, 2016, so that the particular month of publication is not in issue.) 129 pp.

* cited by examiner $C_{adp}$ = adaptation mode signal
$C_{st}$ = system state signal
$C_{trm}$ = trim signal
$C_{crd}$ = system coordination signal
$P_{op}$ = operational mode signal
$P_{req}$ = power request signal
$R_{dmd}$ = demand signal
$X_{act}$ = actuator signal
$X_{eng}$ = engine state trajectory signal
$X_{est}$ = engine parameter estimate signal
$V_{inp}$ = engine input $R_{dmd}$ = demand signal
$V_{inp}$ = input variable
$X_{eng}$ = engine state trajectory signal
$X_{act}$ = actuator signal
$X_{est}$ = engine parameter estimate signal
$X_{upd}$ = model update signal $C_{st}$ = system state signal
$C_{adp}$ = adaptation mode signal
$C_{trm}$ = trim signal
$C_{crd}$ = system coordination signal
$C_{est}$ = engine model estimate signal
$C_{adj}$ = adaptation adjustment signal
$C_{ss}$ = steady-state indication signal
$R_{dmd}$ = power demand signal
$R_{t,dmd}$ = trimmed power demand signal

ADAPTIVE CONTROLLER USING UNMEASURED OPERATING PARAMETER

TECHNICAL FIELD

The disclosure relates to control of engines.

BACKGROUND

Gas turbine engine controllers are designed to satisfy both performance and safety requirements. To achieve this, engine control logic includes three primary functions: steady-state control, transient control, and limit protection. The steady-state control logic is designed to maintain output power at a demanded level in the presence of disturbances and uncertainties. The transient control logic is designed to safely transition the engine from one power level to another within performance requirements. The limit protection logic is designed to ensure that critical parameters never violate constraints. These functions are all integrated via loop selection logic.

In a typical power management loop, the power request is converted to a setpoint. The difference between the setpoint and the corresponding feedback signal is used to drive power management compensation, which ultimately produces a rate command that is output to the loop selection logic. The loop selection logic either passes the rate command through to a common integrator or selects a rate command that is appropriate for the current engine operating mode.

In order to develop control logic for steady-state control, transient control, and limit protection, linear point models may be used to approximate the gas turbine engine system. Specifically, control laws are developed and tuned in a computational environment in which linear point models are used to represent the engine dynamics. Development and tuning occurs for one linear point model at a time, and the resulting individual control laws are integrated together to form control logic satisfying both performance and operability requirements across the complete operating envelope of the engine. The controller is then tested on a non-linear engine system model where additional tuning is accomplished. Once modeling and simulation development is completed, bench and engine testing is conducted to fine tune and verify the control logic. All of the models used for control design generally represent a single engine condition.

If the control logic is to perform acceptably, it must safely accommodate nonlinearities and uncertainties not present in the design models. In addition, control logic must accommodate the effects of disturbances, manufacturing variations, and degradations that will be present in all of the components of the system. Conventional control logic accommodates these factors by implementing margins within the control logic design. However, this approach may reduce engine performance by not allowing the control logic to access engine states in these margins.

SUMMARY

In some examples, a method includes receiving, by an adaptive control module, a power request signal. The method further includes receiving, by the adaptive control module, from a real-time engine model module, an engine parameter estimate signal generated by the real-time engine model module based on at least one feedback signal indicative of an operating parameter of an engine. The method further includes determining, by the adaptive control module and using a set of control laws, a demand signal based on inputs including the power request signal and the engine parameter estimate signal. The method further includes outputting, by the adaptive control module, the demand signal to control at least one component of the engine.

In some examples, a system includes a real-time engine model module and an adaptive control module. The real-time engine model module is configured to determine an engine parameter estimate signal based on at least one feedback signal indicative of an operating parameter of an engine. The adaptive control module is configured to receive a power request signal and receive, from the real-time engine model module, the engine parameter estimate signal. The adaptive control module is further configured to determine a power demand signal based on the power request signal and the engine parameter estimate signal, wherein the adaptive control module is configured to determine the power demand signal based on the power request signal using a set of control laws. The adaptive control module is further configured to output the power demand signal to control at least one component of the engine.

In some examples, a computer-readable storage medium stores instructions that, when executed, cause a processor to receive, by an adaptive control module, a power request signal and receive, by the adaptive control module, from a real-time engine model module, an engine parameter estimate signal generated by the real-time engine model module based on at least one feedback signal indicative of an operating parameter of an engine. The instruction further cause a processor to determine, by the adaptive control module, using a set of control laws, a demand signal based on including the power request signal and the engine parameter estimate signal and output, by the adaptive control module, the demand signal to control at least one component of the engine.

The details of one or more examples are set forth in the accompanying drawings and the description below. Other features, objects, and advantages of the disclosure will be apparent from the description and drawings, and from the claims.

DETAILED DESCRIPTION

Figure 1:
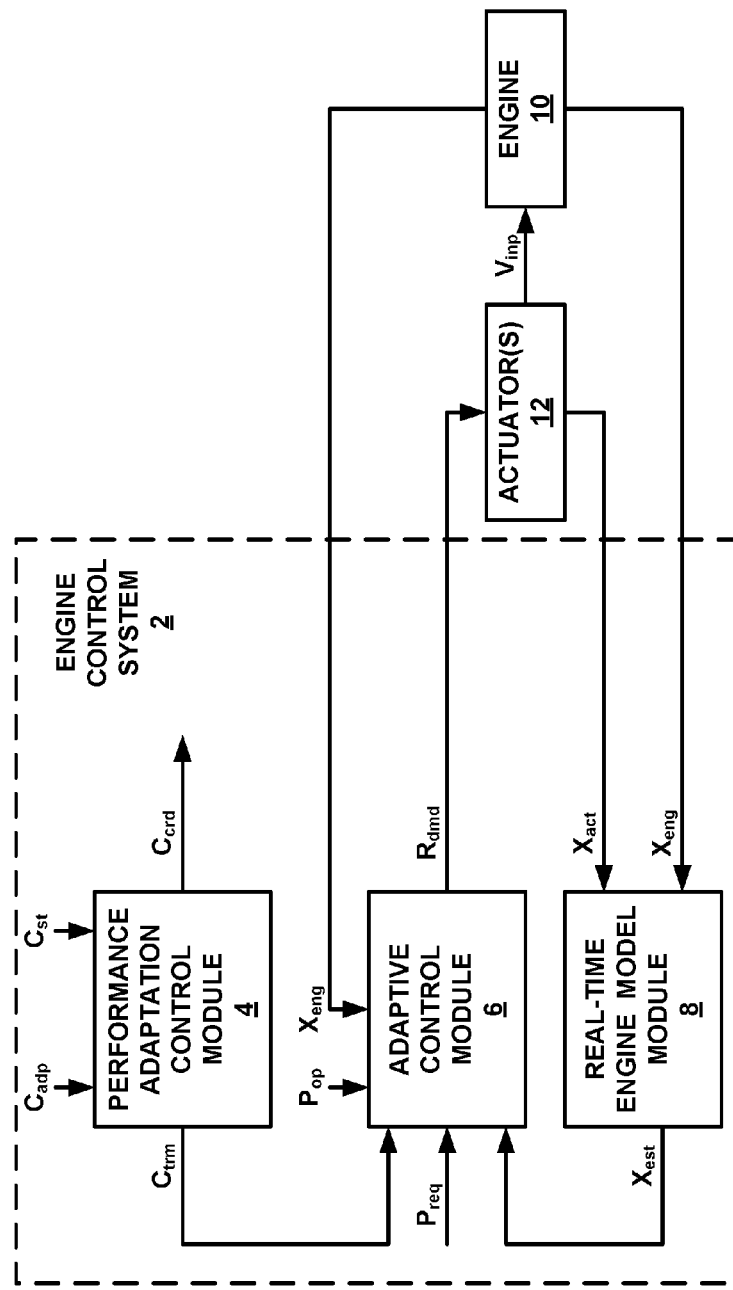
FIG. 1 is a conceptual and schematic block diagram illustrating an example engine control system for controlling an engine.

The disclosure describes systems and techniques for managing operation of an engine. During engine operation, variations in operating conditions, other connected systems, and the engine itself may affect operation of the engine. Additionally, as a power source for a broader power system, the operation of the engine may affect other power system components, such as electrical systems that extract power from the engine. To operate effectively in a power system, an engine control system may use engine and system information to estimate engine parameters, adapt engine control laws, and adjust power demand based on engine conditions and operational situations.

For example, the engine control system may estimate at least one estimated engine parameter based on at least one feedback signal indicative of an operating parameter of the engine and utilize the at least one estimated engine parameter to control the engine. Certain engine parameters may be difficult to measure or unmeasurable, yet may be useful for controlling engine performance when applied to an engine model. For example, for gas turbine engines, engine thrust, high pressure compressor surge margin, or high pressure turbine inlet temperatures, each may be difficult to measure, but may provide information based on which the engine control system may control operation of the engine. The engine control system may utilize the at least one estimated engine parameter to modify power demand to control the engine. For example, the engine control system may use surge margin estimates to control fuel flow to the engine so that operation of the engine is within a particular surge margin.

As another example, the engine control system may also adapt control laws based on the at least one estimated engine parameter to more accurately conform modeled performance to actual engine performance. As engine performance changes, the engine control system tracks the changes and updates a reference model or adaptive control laws to more closely represent actual engine performance. By updating the reference model or adaptive control laws, the engine control system may operate the engine under tighter control margins, which may improve performance of the engine.

As a further example, the engine control system may also modify operational characteristics based on operational situations. For example, a higher-level control system may indicate to the engine control system that a platform system, such as an aircraft, is in an operational situation that indicates a particular operating mode. Particular operating modes may include, for example, a fuel efficient mode, a high responsiveness mode, an engine life extending mode, or the like. The engine control system may determine control parameters, such as power management schedules, setpoints, selection logic, and control laws, based on the particular operating mode. By modifying the control parameters, the engine control system may accommodate a variety of operating modes.

The engine control system may also adapt engine-level or system-level performance by iterating inputs to an iteration algorithm and an adaptive engine model to arrive at an improved set of operating parameters. The engine control system may model performance of the engine using the adaptive engine model and based on one or more of a variety of inputs and control objectives, taking into account power demands of other propulsion or non-propulsion system components, and adjust the power demand to the engine based on the modeled performance. For example, in addition to providing propulsion, an engine may provide power to other propulsion or non-propulsion system components, such as electrical power to electrical components, mechanical power to auxiliary shaft components, hydraulic/pneumatic power to pressure-related components, and the like. By adjusting power demand based on the modeled performance of the engine and other components, the engine control system may operate the engine according to the improved set of operating parameters.

FIG. 1 is a conceptual and schematic block diagram illustrating an example engine control system 2 for controlling an engine 10. In some examples, engine control system 2 may include performance adaptation control module 4, adaptive control module 6, and real-time engine model module 8. Although FIG. 1 will describe control of engine 10, engine control system 2 may be used to control operation of any type of engine or system. Engine control system 2 and the modules included in engine control system 2 may be implemented, at least in part, in hardware, software, firmware, or any combination thereof. For example, the modules included in engine control system 2 may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same physical device or within separate physical devices to support the various techniques described in this disclosure. In addition, any of the described units, modules or components may be implemented together or separately as discrete but interoperable logic devices.

Engine control system 2 may control engine 10, e.g., via one or more actuators 12. Actuators 12 may include electronic, mechanical, or hydraulic components that receive a demand signal, $R_{dmd}$, from adaptive control module 6 and control operation of engine 10 based on the received signal. For example, actuators 12 may include one or more components, such as a motor, a gear assembly, or the like, configured to modify a pitch of one or more airfoils to control airflow through engine 10; one or more components, such as a fuel pump or fuel injector, configured to inject fuel into a combustion chamber, one or more components, such as a motor, linear actuator, or the like, to control a position of an exhaust nozzle; or the like. Actuators 12 may output an input signal, $V_{inp}$, to engine 10 based on the demand signal, $R_{dmd}$. The input signal, $V_{inp}$, may be an electrical, mechanical, or hydraulic signal or process that effects control over one or more components of engine 10, such as an airfoil, fuel pump or fuel injector, exhaust nozzle, or the like. For example, an input signal, $V_{inp}$, may include a change in electrical load on an engine generator that changes the frequency or shaft speed. In another example, an input signal, $V_{inp}$, may include a control valve position for fuel flow to engine 10. Actuators 12 may also output an actuator signal, $X_{act}$, to real-time engine model module 8. Actuator signal $X_{act}$ represents the activity of actuators 12, e.g., position, change, or the like.

Engine 10 may receive the input signal, $V_{inp}$, from actuators 12. Engine 10 may include control components such as sensors configured to measure engine control variables. Sensors in engine 10 may output an engine state trajectory signal, $X_{eng}$, to adaptive control module 6 and real-time engine model module 8. The engine state trajectory signal, $X_{eng}$, may represent at least one engine parameter from actual operation of engine 10. A variety of engines may be used with engine control system 2 including, but not limited to, turboprop, turbofan, turboshaft, turbojet, and the like. As described above, in some examples, engine control system 2 may be used in a control system for another type of engine, such as an internal combustion engine or the like.

Engine control system 2 may include adaptive control module 6. Adaptive control module 6 may be configured to receive a power request signal, $P_{req}$, from a control system (not shown), and at least one engine parameter estimate signal, $X_{est}$, from the real-time engine model module 8, and output a demand signal $R_{dmd}$ that controls operation of engine 10. The power request signal, $P_{req}$, may be a signal from, for example, a control system controlled by an operator of an aircraft requesting a selected power demand for engine 10. The engine parameter estimate signal, $X_{est}$, may represent an unmeasured engine parameter that is estimated by real-time engine model module 8 based on one or more measured engine parameters and an engine model.

Adaptive control module 6 may be configured to determine the demand signal, $R_{dmd}$, based at least in part on the power request signal, $P_{req}$, and the engine parameter estimate signal, $X_{est}$, using a set of control laws. The set of control laws may be algorithms and gain schedules with configurable parameters selected and configured to convert the power request signal, $P_{req}$, and the engine parameter estimate signal, $X_{est}$, to the demand signal, $R_{dmd}$. For example, adaptive control module 6 may output the demand signal, $R_{dmd}$, to actuators 12. By using unmeasured engine parameters estimates to determine the demand signal, $R_{dmd}$, adaptive control module 6 may control engine 10 with reduced design margins and achieve improved performance while maintaining safe operation.

In some examples, adaptive control module 6 may be configured to determine the demand signal, $R_{dmd}$, using a closed-loop reference model. The closed-loop reference model may represent operation of engine 10 for one or more engine control variables. Adaptive control module 6 may execute the closed-loop reference model to simulate operation of engine 10 based on a reference control signal (not shown). Adaptive control module 6 may adjust the reference control signal to produce a target response from the closed-loop reference model, where the target response represents a desired response of operation of engine 10 to the reference control signal. Adaptive control module 6 may use the set of control laws to determine the demand signal, $R_{dmd}$.

In some examples, adaptive control module 6 may be configured to adapt the set of control laws based on actual or estimated engine information to account for changes in the operation of engine 10. Adaptive control module 6 may use engine information, such as the engine state trajectory signal, $X_{eng}$, and the engine parameter estimate signal, $X_{est}$, and model information from the closed-loop reference model to adapt the control algorithms of the control laws so that they are customized to actuators 12 and engine 10. In some examples, adaptive control module 6 may receive the engine state trajectory signal, $X_{eng}$, the engine parameter estimate signal, $X_{est}$, or both. Adaptive control module 6 may compare the engine state trajectory signal, $X_{eng}$, the engine parameter estimate signal, $X_{est}$, or both, to simulated engine behavior from, for example, the closed-loop reference model discussed above to determine adjustments to the set of control laws. Adaptive control module 6 may update the set of control laws to more accurately control engine 10 for its desired performance. By adapting the set of control laws based on engine information and reference model information, adaptive control module 6 may determine a demand signal, $R_{dmd}$, using the set of control laws, that operates engine 10 based on its current operating condition. Adaptive control module 6 may maintain a desired level of engine performance longer as the engine deteriorates or recover lost performance resulting from deterioration, faults, turbine degradation, actuator failure, or damage.

In some examples, adaptive control module 6 may receive an operational mode signal, $P_{op}$, from a control system (not shown). The operational mode signal, $P_{op}$, may represent a set of control parameters selected to achieve particular operating characteristics of engine 10. Operational modes may include, but are not limited to, high efficiency mode, high performance mode, and the like. Adaptive control module 6 may select control parameters such as setpoints, gain schedules, control laws, loop selection logic, and the like, based on the operational mode signal, $P_{op}$. In some examples, the operational mode signal, $P_{op}$, is based on internal or environmental cues from the platform system. Cues may include, but are not limited to: program, such as mission status, trip status, and threat detection; system status, such as engine operator activity; spatial and geospatial, such as GPS; altitudinal; time-based; health-based, such as platform and engine health information; and the like. By adapting control parameters based on internal and external cues, adaptive control module 6 may provide the platform system with improved responsiveness to external conditions. For example, adaptive control module 6 may be part of an aircraft platform system. A mission for the aircraft may include certain mission profiles that correspond to friendly territory and hostile territory. Geospatial cues may be used for an operational mode signal, $P_{op}$, that indicates the type of mission profile, and corresponding operational mode, to adaptive control module 6. For mission segments over friendly territory, adaptive control module 6 may adapt control parameters to improve fuel economy. For mission segments over hostile territory, adaptive control module 6 may adapt control parameters to improve performance, survivability, responsiveness, or the like.

Engine control system 2 may include real-time engine model module 8. Real-time engine model module 8 may be configured to estimate engine performance by tracking engine parameters and estimating at least one unmeasured engine parameter using an adaptive, real-time engine model. Certain engine parameters may be difficult to measure, yet may be useful for controlling engine performance when applied to a real-time engine model. Adaptive control module 6 may use the at least one estimated engine parameter to modify power demand to efficiently or safely operate engine 10. Difficult-to-measure engine parameters may include, but are not limited to, specific fuel consumption, high pressure turbine entry temperature, compressor surge margin, and thrust. Real-time engine model module 8 may estimate at least one unmeasured engine parameter based on actuator information, including an actuator signal indicative of a state of at least one actuator 12, $X_{act}$, and at least one feedback signal indicative of an operating parameter of the engine, including an engine state trajectory signal, $X_{eng}$. Operating parameters of engine 10 may include, but are not limited to, fuel flow rate, air flow rate, actuator position, temperatures, pressures, and the like. Actuator information may include, but is not limited to, inlet vanes position, fuel control valve position, exhaust nozzles position, and the like.

Real-time engine model module 8 may receive at least one actuator signal, $X_{act}$, from actuator 12 or a sensor coupled to actuator 12, and at least one engine state trajectory signal, $X_{eng}$ from engine 10 or a sensor coupled to engine 10. Real-time engine model module 8 may estimate at least one unmeasured engine parameter to determine at least one engine parameter estimate signal, $X_{est}$, based on the at least one actuator signal, $X_{act}$, and the at least one engine state trajectory signal, $X_{eng}$. Real-time engine model module 8 may use a real-time engine model based on engine 10 to estimate the unmeasured engine parameters. The real-time engine model may include parameters that can be changed or modified to adapt the real-time engine model to changes in operation of engine 10. In some examples, real-time engine model module 8 may update the real-time engine model to reflect changes in performance of engine 10. Real-time engine model module 8 may output the engine parameter estimate signals, $X_{est}$, to adaptive control module 6. Adaptive control module 6 may utilize the engine parameter estimate signals, $X_{est}$, for controlling engine 10, as will be described below.

By estimating unmeasured engine parameters and outputting the corresponding engine parameter estimate signals to other components of engine control system 2, real-time engine model module 6 may provide engine control system 2 with improved performance due to reduced design margins on engine operation. By updating the real-time engine model based on the unmeasured parameter estimates in some examples, real-time engine model module 8 may account for deterioration or changes in performance of engine 10.

Engine control system 2 may optionally include performance adaptation module 4. Performance adaptation control module 4 may be configured to adapt system-level performance by trimming propulsion and non-propulsion system components and adjusting control of engine 10 to account for a change in power demand, such as electrical load, from the trimmed components. A platform system may use engine 10 to supply power to other propulsion or non-propulsion system components of the platform system. As systems are brought on- and off-line, the power demand may change. To adjust and improve system and/or engine operation for these changes, performance adaptation control module 4 may indicate adjustments to the power demand of engine 10.

Performance adaptation control module 4 may use an engine reference model to iteratively simulate performance of engine 10 until a particular performance objective is achieved according to an iteration algorithm. In some examples, performance adaptation control module 4 may generate a trim signal, $C_{trm}$, that represents a change in engine demand based on the iterative simulation of performance until the particular performance objective is achieved according to the iteration algorithm.

Performance adaptation control module 4 may be configured to receive an adaptation mode signal, $C_{adp}$, and a system state signal, $C_{st}$. The adaptation mode signal, $C_{adp}$, may be a signal from an external system, such as a higher-level control system, that indicates, to performance adaptation control module 4, a particular adaptation mode according to which to perform adaptation of operation of engine 10. The adaptation mode signal, $C_{adp}$, may indicate to performance adaptation control module 4 to run in a particular performance adaptation mode, such as an efficiency mode, a performance mode, an engine life mode, or the like. The system state signal, $C_{st}$, may be a signal from a system that includes power and operational information about components in the system. For example, the system state signal, $C_{st}$, may include operational information about electrical load for electrical systems that are powered by engine 10. As another example, the system state signal, Cst, may include about pressure requirements for hydraulic systems that are powered by engine 10.

Performance adaptation control module 4 may be further configured to determine a trim signal, $C_{trm}$, and a system coordination signal, $C_{crd}$, based on the adaptation mode signal, $C_{adp}$, the system state signal, $C_{st}$, the iteration algorithm, and the engine reference model. Performance adaptation control module 4 may use the engine reference model to determine the trim signal, $C_{trm}$. The reference model represents an operational model of engine 10. Performance adaptation control module 4 may select the iteration algorithm based on the adaptation mode signal, $C_{adp}$. For example, if the adaptation mode signal, $C_{adp}$, relates to fuel economy, then performance adaptation control module 4 may select an iteration algorithm for improving fuel economy for engine 10. Performance adaptation control module 4 may iteratively model one or more parameters related to fuel efficiency, such as power produced, and adjust a fuel flow parameter to the reference model using the selected iteration algorithm until a target fuel economy is reached.

The trim signal, $C_{trm}$, may represent a change in a demand signal, $R_{dmd}$, to the actuators 12 for engine 10 related to a propulsion or non-propulsion system change in power demand, such as electrical load. For example, if the adaptation mode indicated by the adaptation control signal, $C_{adp}$, does not include operation of a filtration system that utilizes electrical power from engine 10, the trim signal, $C_{trm}$, may indicate to adaptive control module 6 to reduce the demand signal, $R_{dmd}$, to account for the decreased electrical load of the offline filtration system. In some examples, performance adaptation control module 4 may be configured to output the trim signal, $C_{trm}$, to adaptive control module 6, as shown in FIG. 1. In other examples, power adaptation control module 4 may be configured to output the trim signal, $C_{trm}$, to a comparator, which receives the trim signal, $C_{trm}$, and the demand signal $R_{dmd}$, and determines a trimmed demand signal, $R_{t,dmd}$, which is output to actuators 12 (for example, see FIG. 4).

In some examples, adaptive control module 6 may be configured to receive the trim signal, $C_{trm}$, and determine the demand signal, $R_{dmd}$, based, at least in part, on the trim signal, $C_{trm}$. For example, the trim signal, $C_{trm}$, may indicate to adaptive control module 6 that engine 10 should increase or decrease its shaft speed to meet a particular power demand. In some examples, adaptive control module 6 includes a comparator (not shown) that adds or subtracts the trim signal, $C_{trm}$, to or from the demand signal, $R_{dmd}$. The comparator may receive the trim signal, $C_{trm}$, and the demand signal, $R_{dmd}$, determine a trimmed demand signal, $R_{t,dmd}$, based on the trim signal, $C_{trm}$, and the demand signal, $R_{dmd}$, and output the trimmed demand signal, $R_{t,dmd}$, to control at least one component of engine 10. In some examples, the comparator is separate from adaptive control module 6. By modifying the demand signal, $R_{dmd}$, based on a change in power produced by or extracted from engine 10, adaptive control module 6 may control engine 10 to meet system-wide performance targets, such as efficiency.

Performance adaptation control module 4 also may output a system coordination signal, $C_{crd}$, to the one or more propulsion or non-propulsion control systems. The system coordination signal, $C_{crd}$, may identify and indicate, to propulsion or non-propulsion control systems, any propulsion or non-propulsion system components that should be adjusted for the particular performance adaptation mode. Continuing with the above example, the system coordination signal, $C_{crd}$, may indicate to a control system to take the filtration system offline, or adjust performance of the filtration system to improve performance of the overall system.

By simulating system-level performance and indicating adjustments to the demand signal, $R_{dmd}$, to actuators 12, performance adaptation control module 4 may increase the efficiency of engine 10, increase the performance of engine 10, or provide like improvements to engine performance targets.

Figure 2:
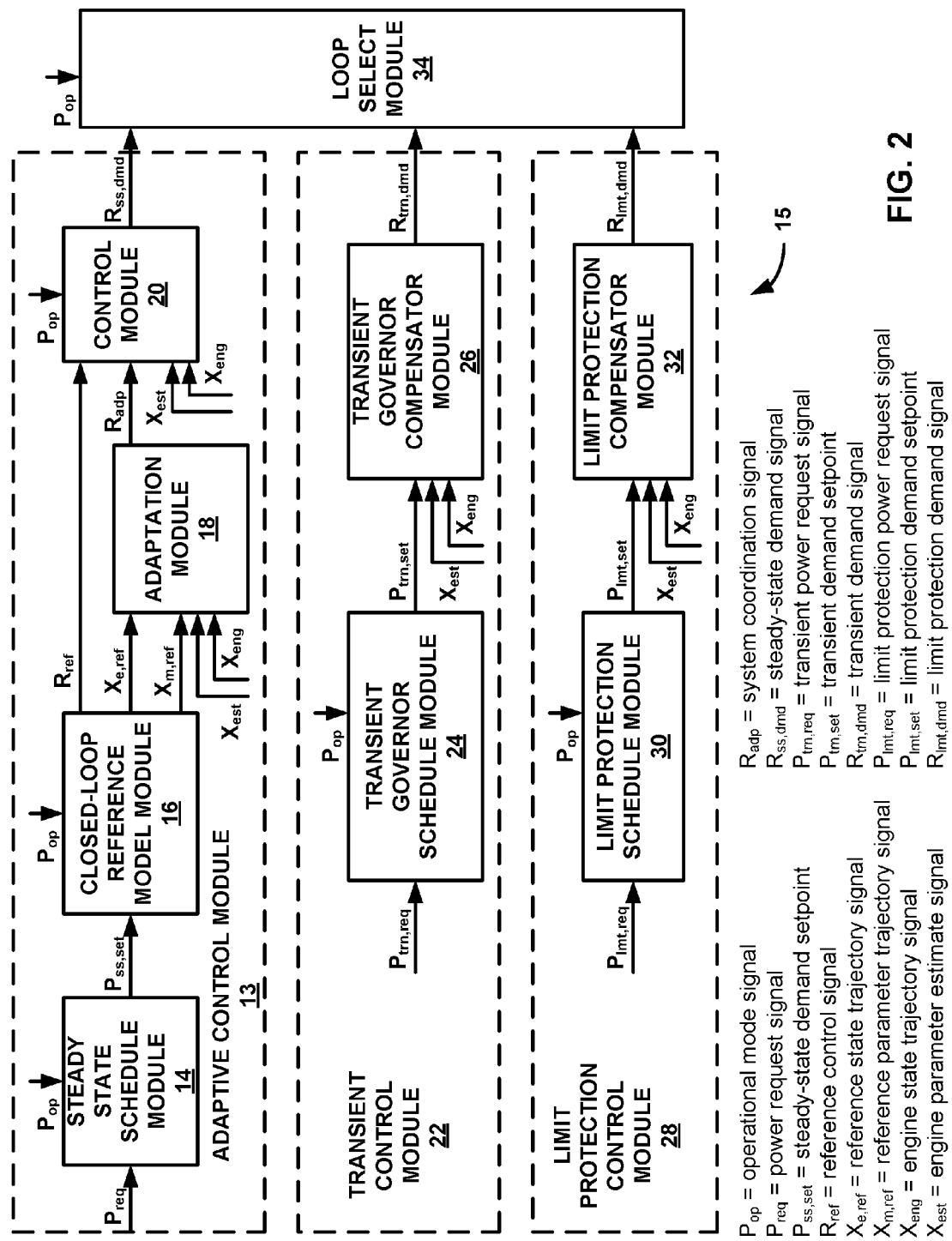
FIG. 2 is a conceptual and schematic block diagram illustrating an example engine control system for controlling an engine that includes steady-state, transient, and limit protection operation.

Although FIG. 1 illustrates adaptive control module 6 as a single module, adaptive control module 6 may be configured for a variety of functions in a control system. For example, a larger control system may include separate modules for steady-state operation, transient operation, and limit control. FIG. 2 is a conceptual and schematic block diagram illustrating an example engine control system 15 for controlling engine 10 in a system that may include steady-state, transient, and limit protection operation. While engine control system 15 includes adaptive control for steady-state operation, the principles of adaptive control discussed below may be used for transient or limit protection operation. For example, steady-state schedule module 14, closed-loop reference module 16, adaptation module 18, and control module 20 of steady-state adaptive control module 13 may be configured for transient operation and substituted for transient controller 22, for limit protection control and substituted for limit protection controller 28, or combinations thereof. Adaptive control module 6 includes a steady-state control module 13, a transient control module 22, and a limit protection control module 28 for controlling engine 10.

Engine control system 15 may include steady-state adaptive control module 13. Steady-state adaptive control module 13 may be configured to determine a steady-state demand signal, $R_{ss,dmd}$, from a power request signal, $P_{req}$. Steady-state control module 13 may include steady-state schedule module 14, closed-loop reference module 16, control module 20, and adaptation module 18.

Steady-state schedule module 14 may be configured to convert a power request signal, $P_{req}$, to engine control system 15, into a steady-state demand setpoint, $P_{ss,set}$, for one or more engine controlled variables associated with the power request signal, $P_{req}$. To perform this conversion, schedule module 14 may receive the power request signal, $P_{req}$, from, for example, a control system (not shown). Steady-state schedule module 14 may determine the steady-state demand setpoint, $P_{ss,set}$, from the power request signal, $P_{req}$, and output the steady-state demand setpoint, $P_{ss,set}$, to closed-loop reference module 16. The steady-state demand setpoint, $P_{ss,set}$, may be a steady-state operational setpoint for an engine control variable associated with engine 10.

In some examples, steady-state schedule module 14 may receive an operational mode signal, $P_{op}$, from an external control system (not shown) to function in a particular operational mode. Steady-state schedule module 14 may select a steady-state schedule based on the operational mode signal $P_{op}$. Steady-state schedule module 14 may determine the steady-state demand setpoint, $P_{ss,set}$, using the steady-state schedule selected in response to the operational mode signal, $P_{op}$. For example, if the operational mode signal, $P_{op}$, indicates a performance mode, steady-state schedule module 14 may select a schedule that has a higher schedule gain to improve performance.

Steady-state schedule module 14 may include a list or database of gain schedules calibrated for particular steady-state demand setpoints, $P_{ss,set}$, of engine control variables and particular operational mode signals, $P_{op}$, of operational modes of engine 10. For example, steady-state schedule module 14 may receive a power request signal, $P_{req}$, for a particular power level, look up a steady-state demand setpoint, $P_{ss,set}$, for a shaft speed associated with the power request signal, $P_{req}$, and output the steady-state demand setpoint, $P_{ss,set}$, for the shaft speed. Engine controlled variables may include, but are not limited to, shaft speeds, pressure ratios, and torque. In some examples, steady-state schedule module 14 may take into account operating conditions of engine 10 when determining the steady-state demand setpoint, $P_{ss,set}$.

Closed-loop reference module 16 may represent the system that acts on the steady-state demand setpoint(s), $P_{ss,set}$, to produce a reference control signal, $R_{ref}$. Closed-loop reference module 16 may assist in maintaining signal stability and reducing control error by correcting the steady-state demand setpoint, $P_{ss,set}$, based on a closed-loop response simulated by a reference model. Closed-loop reference module 16 may receive the steady state demand setpoint, $P_{ss,set}$, from steady-state schedule module 14. Closed-loop reference module 16 may determine the reference control signal, $R_{ref}$, based on the steady state demand setpoint, $P_{ss,set}$, the reference state trajectory signal, $X_{m,ref}$, and a reference parameter trajectory signal, $X_{e,ref}$. Closed-loop reference module 6 may output the reference state trajectory signal, $X_{m,ref}$, and the reference parameter trajectory signal, $X_{e,ref}$, to adaptation module 18, and the reference control signal, $R_{ref}$, to control module 20.

The reference control signal, $R_{ref}$, may represent a measurable, manipulated engine variable associated with operation of engine 10. The reference state trajectory signal, $X_{m,ref}$, may represent the response of the reference model to the reference control signal, $R_{ref}$. The reference parameter trajectory signal, $X_{e,ref}$, may represent the simulated response of closed-loop reference module 16 to the reference control signal, $R_{ref}$, for an unmeasured engine parameter, such as the unmeasured engine parameter corresponding to engine parameter estimate signal, $X_{est}$. Engine control variables may include, but are not limited to, fuel flow and air flow. Each measurable engine control variable may have an associated engine component that controls the measurable engine control variable. For example, fuel flow may be controlled by a fuel valve, while air flow may be controlled by variable stator vanes.

Closed-loop reference module 16 may operate in a closed-loop, in which closed-loop reference module 16 determines the reference state trajectory signal, $X_{m,ref}$, and the reference parameter estimate signal, $X_{e,ref}$, based on the reference model and adjusts the reference control signal, $R_{ref}$, based on the reference state trajectory signal, $X_{m,ref}$, the reference parameter estimate signal, $X_{e,ref}$, or both. Closed-loop reference module 16 may adjust the control reference signal, $R_{ref}$, to produce a reference state trajectory signal, $X_{m,ref}$, a reference parameter estimate signal, $X_{e,ref}$, or both, from the reference model that is similar to or substantially the same as a desired operation of engine 10. Closed-loop reference module 16 may be tuned across operating conditions based on the response to the reference state trajectory signal, $X_{m,ref}$, the reference parameter estimate signal, $X_{e,ref}$, or both, and continue to compensate for the reference state trajectory signal, $X_{m,ref}$, the reference parameter estimate signal, $X_{e,ref}$, or both, during operation of engine 10. By operating in a closed loop, closed-loop reference module 16 may use modeled engine information to adjust the reference control signal, $R_{ref}$, upstream of control module 20.

Closed-loop reference module 16 may simulate operation of engine 10 using one or more reference models. Closed-loop reference module 16 may utilize any reference model capable of producing reference state trajectory signals, $X_{ref}$, of engine controlled variables, including multiple reference models over a range of operating conditions for engine 10. In some examples, closed-loop reference module 16 may include a reference model configured to output unmeasured engine parameters. Reference models that may be used include, but are not limited to, linear models such as piecewise linear models; nonlinear models such as nonlinear thermodynamic cycle models; and any other model capable of representing dynamic or steady-state performance of engine 10. For example, a linear design model may be piecewise linear to handle changes in operating conditions. In other words, in some examples, the linear design model may be composed of multiple linear models, each linear model representing operation of engine 10 over a portion of the operating range of engine 10.

Adaptation module 18 may determine error between actual engine operation and modeled engine operation and output an adaptation signal, $R_{adp}$, that allows control module 20 to compensate for this error. Error may include, for example, manufacturing variations in engine 10 that deviate from the engine model, degradations in performance of engine 10 over its life, and variations in sensors and actuators of the engine that may change over time. Adaptation module 18 includes a set of adaptation laws. The set of adaptation laws may be configured to reduce or substantially cancel effects of uncertainties in engine control system 15. Adaptation module 18 may use engine information, such as the engine state trajectory signal, $X_{eng}$, and the engine parameter estimate signal, $X_{est}$, and model information from the closed-loop reference model, such as the reference state trajectory signal, $X_{m,ref}$, and the reference parameter trajectory signal, $X_{e,ref}$, to determine an adaptation signal, $R_{adp}$, that control module 20 may use to adapt the control algorithms of the control laws so that they are customized to actuators 12 and engine 10.

Adaptation module 18 may receive the reference state trajectory signal, $X_{m,ref}$, and the reference parameter trajectory signal, $X_{e,ref}$, from closed-loop reference module 6, the engine state trajectory signal, $X_{eng}$, from engine 10, and the engine parameter estimate signal, $X_{est}$, from real-time engine model module 8. Adaptation module 18 may determine the adaptation signal, $R_{adp}$, based on the reference state control signal, $X_{m,ref}$, the reference parameter trajectory signal, $X_{e,ref}$, the engine state trajectory signal, $X_{eng}$, and the engine parameter estimate signal, $X_{est}$. In some examples, adaptation module 18 may determine a difference between the reference parameter trajectory signal, $X_{e,ref}$, and the engine parameter estimate signal, $X_{est}$, and determine the adaptation signal, $R_{adp}$, based on at least the difference between the reference parameter trajectory signal, $X_{e,ref}$, and the engine parameter estimate signal, $X_{est}$. By using the engine parameter estimate signal, $X_{est}$, and the reference parameter trajectory signal, $X_{e,ref}$, to determine the adaptation signal, $R_{adp}$, adaptation module 18 may create adjustments to control module 20 that account for unmeasured engine parameters estimated by real-time engine model module 8. Adaptation module 18 may output the adaptation signal, $R_{adp}$, to control module 20.

Control module 20 may receive a variety of engine signals, e.g. engine state trajectory signal, $X_{eng}$, and engine parameter estimate (not shown), reference state trajectory signal, $X_{ref}$, through reference control signal, $R_{ref}$, and adaptation signal, $R_{adp}$, and operational mode signal (not shown) inputs to generate a steady-state demand signal, $R_{ss,dmd}$, from those inputs to control engine 10 or actuators 12 based on a set of control laws. The set of control laws may be algorithms and gain schedules with configurable parameters selected and configured to convert the reference control signal, $R_{ref}$, the adaptation signal, $R_{adp}$, the engine state trajectory signal, $X_{eng}$, and the engine parameter estimate signal, $X_{est}$, into a steady-state demand signal, $R_{ss,dmd}$, that actuators 12 or other control components for engine 10 may use to control engine control variables. The set of control laws may be selected and configured, for example, based on the characteristics of components, such as sensors, actuators, and propulsion components, of engine 10.

Control module 20 may receive the adaptation signal, $R_{adp}$, from adaptation module 18 and the reference control signal, $R_{ref}$, from closed-loop reference module 16. Control module 20 may determine a steady-state demand signal, $R_{ss,dmd}$, from at least one of the reference control signal, $R_{ref}$, the adaptation signal, $R_{adp}$, the engine parameter estimate signal, $X_{est}$, and the engine state trajectory signal, $X_{eng}$. For example, the engine parameter estimate signal, $X_{est}$, may represent an estimate of thrust. Control module 20 may use the estimate of thrust to adjust the steady-state demand signal, $R_{ss,dmd}$, to operate engine 10 to substantially track the reference parameter estimate signal, $X_{e,ref}$. Control module 20 may output the steady-state demand signal, $R_{ss,dmd}$, to loop selection logic 34.

In some examples, control module 20 may be configured to adapt the set of control laws based on actual or estimated engine information contained, for example, in the adaptation signal, $R_{adp}$, to account for changes in the operation of engine 10. Control module 20 may receive the adaptation signal, $R_{adp}$, from adaptation module 18. Control module 20 may update configurable parameters and gain schedules in the set of control laws based on the adaptation signal, $R_{adp}$, to more accurately control engine 10 for its desired performance.

In some examples, control module 20 may be further configured to receive the trim signal, $C_{trm}$, and determine the demand signal, $R_{dmd}$, based, at least in part, on the trim signal, $C_{trm}$. For example, the trim signal, $C_{trm}$, may indicate to control module 20 that engine 10 should increase or decrease its shaft speed to meet a particular electrical load. In some examples, control module 20 includes a comparator that adds or subtracts the trim signal, $C_{trm}$, to or from the demand signal, $R_{dmd}$.

In some examples, control module 20 may receive an operational mode signal, $P_{op}$, from a control system (not shown) to select a set of control laws based on an operational mode of engine 10, as described above. For example, if the operational mode is for fuel conservation, control module 20 may select a set of control laws that are selected for fuel efficiency.

Engine control system 15 may also include transient control module 22 to determine a transient demand signal, $R_{trn,dmd}$, from the power request signal, $P_{req}$. Transient control module 22 may include transient governor schedule module 24 and transient governor compensator module 26.

Transient governor schedule module 24 may be configured to convert a transient power request signal, $P_{trn,req}$, to transient control module 22, into a transient demand setpoint, $P_{trn,set}$, for one or more engine control variables associated with the transient power request signal, $P_{trn,req}$. To perform this conversion, transient governor schedule module 24 may receive the transient power request signal, $P_{trn,req}$, determine a transient demand setpoint, $P_{trn,set}$, based on the transient power request signal, $P_{trn,req}$, and output the transient demand setpoint, $P_{trn,set}$, to transient governor compensator module 26. The transient power request signal, $P_{trn,req}$, may be a signal from, for example, a control system controlled by an operator of an aircraft requesting a selected transient power demand for engine 10. Schedule module 4 may include a list or database of gain schedules calibrated for particular transient demand setpoints, $P_{trn,set}$, of engine control variables.

In some examples, transient governor schedule module 24 may receive an operational mode signal, $P_{op}$, from a control system (not shown) to select a transient schedule based on an operational mode of engine 10, as described above. For example, if the operational mode is for high performance, transient governor schedule module 24 may select a transient schedule that has a higher gain schedule for greater acceleration.

Transient governor compensator module 26 may receive the transient demand setpoint, $P_{trn,set}$, from transient governor schedule module 22, the engine state trajectory signal, $X_{eng}$, from engine 10, and the engine parameter estimate signal, $X_{est}$, from real-time engine model module 8. Transient governor compensator module 24 may determine a transient demand signal, $R_{trn,dmd}$, based on the transient demand setpoint, $P_{trn,set}$, the engine state trajectory signal, $X_{eng}$, and the engine parameter estimate signal, $X_{est}$. For example, the engine parameter estimate signal, $X_{est}$, may represent an estimate of high pressure compressor surge margin. Transient governor compensator module 26 may use the estimate of high pressure compressor surge margin to determine a transient demand signal, $R_{trn,dmd}$, that is within a minimum safe surge margin during engine acceleration. Transient governor compensator module 26 may output the transient demand signal, $R_{trn,dmd}$, to loop selection logic 34. By using the engine parameter estimate signal, $X_{est}$, to determine the transient demand signal, $R_{trn,dmd}$, transient governor compensator module 26 may control transient operating conditions based on important, but unmeasurable, engine parameters.

Engine control system 15 may further include limit protection control module 28 to determine a limit protection demand signal, $R_{lmt,dmd}$, from the power request signal, $P_{req}$. Limit protection control module 28 may include limit protection schedule module 26 and limit protection compensator module 28.

Limit protection schedule module 30 may be configured to convert a limit protection power request signal, $P_{lmt,req}$, to limit protection control module 28, into a limit protection demand setpoint, $P_{lmt,set}$, for one or more engine control variables associated with the limit protection power request signal, $P_{lmt,req}$. To perform this conversion, limit protection schedule module 30 may receive the limit protection power request signal, $P_{lmt,req}$, determine a limit protection demand setpoint, $P_{lmt,set}$, based on the limit protection power request signal, $P_{lmt,req}$, and output the limit protection demand setpoint, $P_{lmt,set}$, to limit protection compensator module 32. Limit protection schedule module 30 may include a list or database of gain schedules calibrated for particular limit protection demand setpoints, $P_{lmt,set}$, of engine control variables.

In some examples, limit protection schedule module 30 may receive an operational mode signal, $P_{op}$, from a control system (not shown) to select a limit protection schedule based on an operational mode of engine 10, as described above. For example, if the operational mode is for high performance, limit protection schedule module 30 may select a limit protection schedule that has broader limits for operational parameters, such as surge margin.

Limit protection compensator module 32 may receive the limit protection demand setpoint, $P_{lmt,set}$, from limit protection schedule module 30, the engine state trajectory signal, $X_{eng}$, from engine 10, and the engine parameter estimate signal, $X_{est}$, from real-time engine model module 8. Limit protection compensator module 32 may determine a limit protection demand signal, $R_{lmt,dmd}$, based on the limit protection demand setpoint, $P_{lmt,set}$, the engine state trajectory signal, $X_{eng}$, and the engine parameter estimate signal, $X_{est}$. For example, the engine parameter estimate signal, $X_{est}$, may represent an estimate of high pressure turbine inlet temperatures. Protection limit compensator module 32 may use the estimate of high pressure turbine inlet temperatures to determine a limit protection demand signal, $R_{lmt,dmd}$, that operates engine 10 below a maximum temperate at the high pressure turbine inlet. Limit protection compensator module 32 may output the limit protection demand signal, $R_{lmt,dmd}$, to loop selection logic 34. By using the engine parameter estimate signal, $X_{est}$, to determine the limit protection demand signal, $R_{trn,dmd}$, limit protection compensator module 32 may enforce performance limits based on unmeasurable engine parameters that may be related, for example, to safe operation of engine 10.

Loop selection logic 34 may be configured to select an appropriate demand signal for a particular engine operating mode or combine two or more demand signals for a comprehensive control signal. Loop selection logic 34 may be configured to receive at least one of the steady state demand signal, $R_{ss,dmd}$, the transient demand signal, $R_{trn,dmd}$, or the limit protection demand signal, $R_{lmt,dmd}$. In some examples, loop selection logic 34 may select at least one of the steady state demand signal, $R_{ss,dmd}$, transient demand signal, $R_{trn,dmd}$, or limit protection demand signal, $R_{lmt,dmd}$, for output to actuator 12. In other examples, loop selection logic 34 may combine at least two of the steady state demand signal, $R_{ss,dmd}$, transient demand signal, $R_{trn,dmd}$, or limit protection demand signal, $R_{lmt,dmd}$, into a combined demand signal. Loop selection logic 34 may output the demand signal, $R_{dmd}$, to one or more actuator(s) 32 to control a component of engine 10.

In some examples, loop selection logic 34 may receive an operational mode signal, $P_{op}$, from a control system (not shown) to select or integrate one or more of the steady-state demand signal, $R_{ss,dmd}$, the transient demand signal, $R_{trn,dmd}$, or the limit protection demand signal, $R_{lmt,dmd}$, based on an operational mode of engine 10, as described above. For example, if the operational mode is in fuel conservation mode, loop selection logic 34 may balance an integrated demand signal, $R_{dmd}$, more heavily for steady-state operation.

Figure 3:
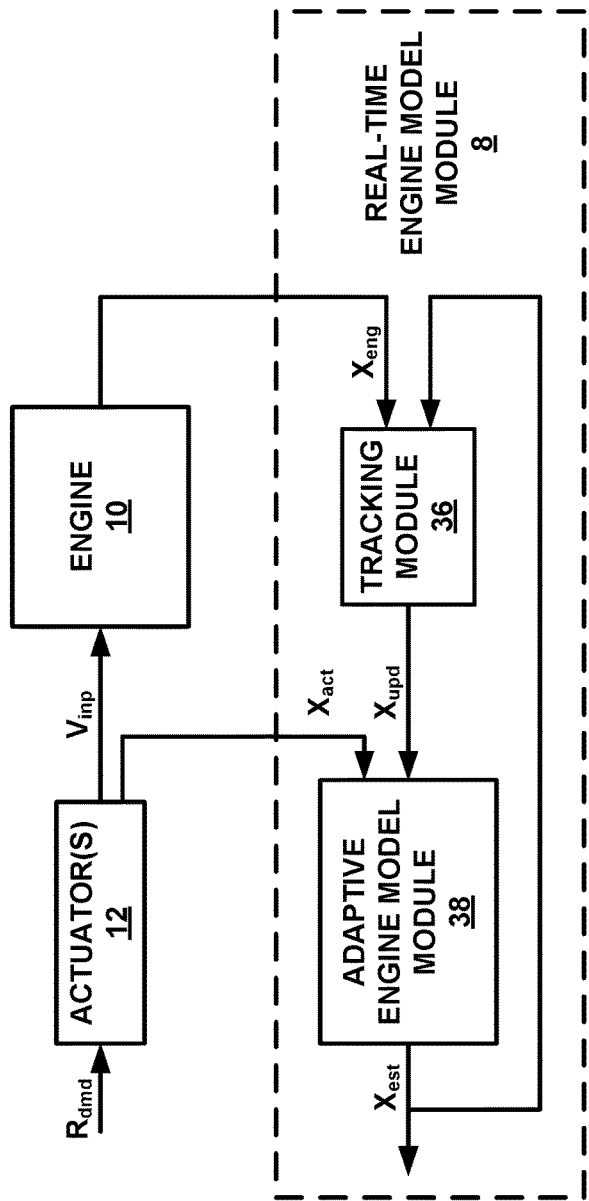
FIG. 3 is a conceptual and schematic block diagram illustrating an example real-time engine model module for controlling an engine.

While FIG. 2 illustrates aspects of model-based adaptive control, engine control system 2 may also include model-based engine control for estimating unmeasured engine parameters associated with engine performance. For example, engine control system 2 may include one or more modules for adaptive, model-based engine control to estimate unmeasured engine parameters for steady-state, transient, and limit protection systems. FIG. 3 is a conceptual and schematic block diagram illustrating an example real-time engine model module 8 for controlling an engine. Real-time engine model module 8 may include a tracking module 36 and an adaptive engine model module 38.

Real-time engine module 8 may include tracking module 36 to use measured engine parameter estimate signals, $X_{est}$, and engine state trajectory signals, $X_{eng}$, and produce a real-time engine model update based on the tracked measured engine parameter estimate signals, $X_{est}$, and engine state trajectory signals, $X_{eng}$. Tracking module 36 may receive an engine state trajectory signal, $X_{eng}$, from engine 10 and an engine variable estimate signal, $X_{est}$, from adaptive engine model module 38. In some examples, tracking module 36 may track the engine parameter estimate signal, $X_{est}$, and the engine state trajectory signal, $X_{eng}$, over a period of time to determine any changes in engine performance. Tracking module 36 may determine a tracking update signal, $X_{upd}$, based on the engine state trajectory signal, $X_{eng}$, and the engine parameter estimate signal, $X_{est}$.

Tracking module 36 may output the tracking update signal, $X_{upd}$, to adaptive engine model module 38.

Real-time engine model module 8 may include adaptive engine model module 38 to simulate engine 10, determine one or more engine parameter estimate signals, $X_{est}$, using the real-time engine model, and update the real-time engine model based on the tracking update signal, $X_{upd}$. Adaptive engine model module 38 may receive the tracking update signal, $X_{upd}$, from tracking module 36 and an actuator signal, $X_{act}$, from actuator(s) 12. Adaptive engine model module 38 may determine the engine variable estimate signal, $X_{est}$, based on the actuator signal, $X_{act}$, and the tracking update signal, $X_{upd}$. Adaptive engine model module 38 may output the engine parameter estimate signal, $X_{est}$, to steady-state adaptive control module 13, transient control module 22, limit protection control module 28, or any combination thereof.

A control system that uses real-time engine model module 8 to estimate unmeasured engine parameters for control system components may more accurately control an engine based on estimated unmeasured engine parameters. Real-time engine model module 8 may determine, using the real-time engine model, the engine parameter estimate signal, $X_{est}$, based on the actuator signal, $X_{act}$, and the engine state trajectory signal, $X_{eng}$. The engine parameter estimate signal, $X_{est}$, represents an unmeasured engine parameter. Real-time engine model module 8 may track the engine parameter estimate signal, $X_{est}$, and the engine state trajectory signal, $X_{eng}$, to determine changes in engine performance. Real-time engine model module 8 may update the real-time engine model based on the engine parameter estimate signal, $X_{est}$, and the engine state trajectory signal, $X_{eng}$, to more accurately reflect engine performance. In some examples, real-time engine model module 8 may track the engine parameter estimate signal, $X_{est}$, and the engine state trajectory signal, $X_{eng}$, over a period of time to determine any changes in engine performance. Adaptation module 18 may determine the adaptation signal, $R_{adp}$, based on the difference between the reference parameter trajectory signal, $X_{e,ref}$, and the engine parameter estimate signal, $X_{est}$, which control module 20 may use to adjust the control laws. Control module may also use the engine parameter estimate signal, $X_{est}$, to adjust the demand signal, $R_{dmd}$.

Figure 4:
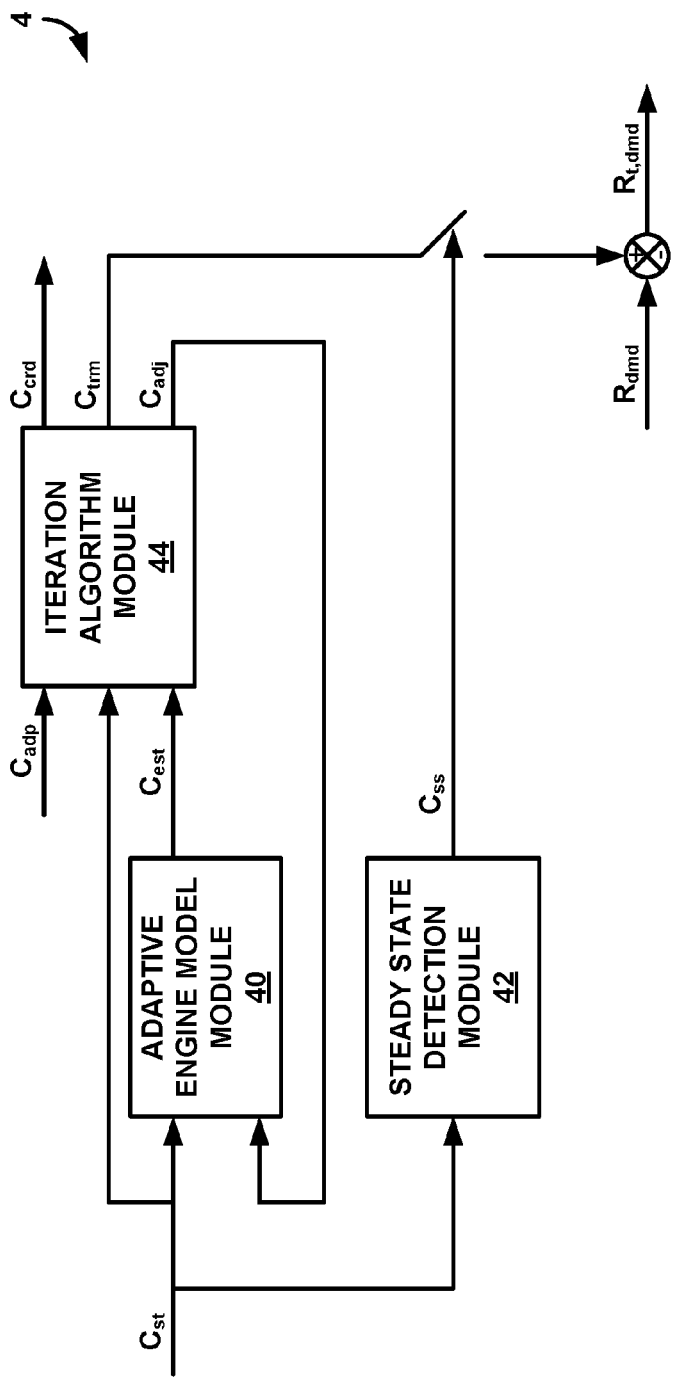
FIG. 4 is a conceptual and schematic block diagram illustrating an example performance adaptation control module for controlling an engine.

While FIGS. 2 and 3 discuss aspects of propulsion control, engine control system 2 may also be configured to operate with propulsion or non-propulsion systems. For example, engine 10 may be configured to supply power, such as electrical power, to propulsion or non-propulsion system components. These components may not be needed at particular times, and a platform system implemented with engine control system 2 may meet certain performance targets by trimming particular propulsion and non-propulsion system components, such as unneeded systems. Trimming may refer to adding a bias, whether positive or negative, to the demand signal, $R_{dmd}$, related to changes in propulsion and non-propulsion systems. Trimming may include taking a system offline, bringing a system back online, powering up a system, powering down a system, or any other way of changing the system status to increase or decrease engine load. FIG. 4 is a conceptual and schematic block diagram illustrating an example performance adaptation control module 4 for controlling an engine. Performance adaptation control module 4 may be configured to adjust performance of engine 10 (FIG. 1) based on an iterative algorithm, an adaptive engine model, an iteration algorithm control signal, and a system state signal. Performance adaptation module 4 may include an iteration algorithm module 44, an adaptive engine model module 40, and a steady-state detection module 42.

Performance adaptation control module 4 may be configured to adapt system-level performance by trimming propulsion and non-propulsion system components and adjusting an engine to account for a change in load from the trimmed components. For example, certain systems may not be needed at a particular time, yet may use power from engine 10. Performance adaptation control module 4 may use a system reference model to simulate system-level performance until a particular performance objective is achieved. Performance adaptation control module 4 may coordinate with one or more propulsion or non-propulsion systems to trim (e.g., take offline) any propulsion or non-propulsion system components to be trimmed and generate a trim signal, $C_{trm}$, that represents a change in engine demand based on the change in load of the trimmed components.

Performance adaptation control module 4 may include adaptive engine model module 40. Adaptive engine model module 40 is a model of operation of engine 10, and may include a linear model, a piecewise linear model, non-linear model, or the like. Adaptive engine model module 40 may be configured to receive a system state signal, $C_{st}$, from an external system (not shown) and a trial signal, $C_{trl}$, from iteration algorithm module 44. The system state signal, $C_{st}$, may be a signal from the external system that includes information about components in propulsion and non-propulsion systems. For example, the system state signal, $C_{st}$, may include measurable information such as rotor speed, altitude, airspeed, and the like, as well as unmeasurable information such as modeled values in response to proposed conditions for $C_{crd}$. These system components may be configured to receive power, such as electrical power, from engine 10. For example, the system state signal may include status and operational information about electrical load for electrical systems that are powered by engine 10. The adaptation adjustment signal, $C_{adj}$, may represent one or more engine control variables that may vary based on changes to propulsion or non-propulsion system power demand. For example, the adaptation adjustment signal, $C_{adj}$, may be a fuel flow value. Adaptive engine model module 40 may determine engine model estimate signal, $C_{est}$, based on the adaptation adjustment signal, $C_{adj}$, and the system state signal, $C_{st}$, and using an adaptive engine model. The adaptive engine model may be configured to simulate operation of engine 10. The engine model estimate signal, $C_{est}$, may represent the simulated response from adaptive engine model module 40 for a particular adaptation adjustment signal, $C_{adj}$.

Performance adaptation control module 4 may include iteration algorithm module 44. Iteration algorithm module 44 may be configured to receive an adaptation mode signal, $C_{adp}$, the system state signal, $C_{st}$, and the engine model estimate signal, $C_{est}$. The adaptation mode signal, $C_{adp}$, may be a signal from an external system that indicates a particular adaptation mode to performance adaptation control module 4, such as a maximum efficiency mode or maximum performance mode. Performance objectives that may be improved may include any process that can be modeled with an equation that includes a minimum or maximum. Performance objectives may include life extension, such as by minimizing temperature of engine 10; increasing electrical power, such as storing up for a directed energy weapon shot; thermal management, such as cooling off at end of flight or cooling a phase change material for thermal storage in anticipation a directed energy weapon shot, and the like. The particular adaptation mode may include one or more performance targets for engine 10. For example, a performance target may be fuel efficiency. The system state signal, $C_{st}$, may indicate to iteration algorithm module 44 the status of variable propulsion or non-propulsion systems that may be adjusted during performance adaptation. In some examples, iteration algorithm module 44 may determine a performance target based on the adaptation mode signal, $C_{adp}$. For example, if the adaptation mode signal, $C_{adp}$, indicated a high efficiency mode, iteration algorithm module 44 may select a performance target for a variable, such as fuel flow, that correlates with high efficiency.

Iteration algorithm module 44 may determine the adaptation adjustment signal, $C_{adj}$, based on the engine model estimate signal, $C_{est}$, the adaptation mode signal, $C_{adp}$, and the system state signal, $C_{st}$, using at least one iteration algorithms. Iteration algorithm module 44 may select at least one iteration algorithm based on one or more performance targets indicated by the adaptation mode signal, $C_{adp}$. At least one iteration algorithm may be generalized to allow arbitrary inputs, outputs, and objects. For example, iteration algorithm module 44 may use electrical load information for propulsion or non-propulsion system components indicated by the system state signal, $C_{st}$, as inputs to at least one iteration algorithm.

For determination of the adaptation adjustment signal, $C_{adj}$, iteration algorithm module 44 may add or remove the propulsion or non-propulsion system components as inputs to the at least one iteration algorithm to achieve the one or more performance target. Adaptive engine model module 40 and iteration algorithm module 44 may work iteratively to achieve steady-state operation of the engine model estimate signal, $C_{est}$, for the particular configuration of propulsion non-propulsion system components that meet the performance target indicated by adaptation mode signal, $C_{adp}$. Once the performance target has been reached, iteration algorithm module 44 may determine a trim signal, $C_{trm}$, based on the engine model estimate signal, $C_{est}$. The trim signal, $C_{trm}$, may represent a change in a demand signal, $R_{dmd}$, to the actuators 12 for engine 10 related to a propulsion or non-propulsion system change in power demand by the addition or removal of propulsion or non-propulsion system components as inputs to at least one iteration algorithm of iteration algorithm module 44. Iteration algorithm module 44 may also determine a coordination signal, $C_{crd}$, based on the propulsion or non-propulsion system components that were added or removed. Iteration algorithm module 44 may output the system coordination signal to, for example, a platform control system or other high-level adapter internal or external to the propulsion system. Iteration algorithm module 44 may be further configured to output the trim signal, $C_{trm}$, to adaptive control module 6.

While the iterative process of performance adaptation control module 4 has been described in terms of separate adaptive engine model module 40 and iteration algorithm module 44, elements of the iterative and modeling processes may be performed by modules outside engine control system 2. For example, instead of proposing a condition on $C_{crd}$, and receiving a new model state on system state signal, $C_{st}$, an external system execute a platform model to determine the system state signal, $C_{st}$, and the external system may send the system state signal, $C_{st}$, including gradient information such as the slope of dependent variables versus independent variables in response to current state information sent in $C_{crd}$ by iteration algorithm module 44. The coordination signal, $C_{crd}$, and the state signal, $C_{st}$, may be used by performance adaptation control module 4 to do system-level modeling and optimization, even though portions of the system model may be executed by the platform and inaccessible to the engine control system.

Performance adaptation control module 4 may also include steady-state detection module 42. Steady-state detection module 42 may be configured to receive the system state signal, $C_{st}$, and determine a steady-state indication signal, $C_{ss}$, based on the system state signal, $C_{st}$. For example, steady-state detection module 42 may receive operating parameters for components through the system state signal, $C_{st}$, and determine from the operating parameters that the platform system is operating at steady-state. Steady-state detection module 42 may output the steady-state indication signal, $C_{ss}$, to a component, such as a switch, that control output of the trim signal, $C_{trm}$, to, for example, adaptive control module 6.

In some examples, adaptive control module 6 includes a comparator that adds or subtracts the trim signal, $C_{trm}$, to or from the demand signal, $R_{dmd}$. The comparator may receive the trim signal, $C_{trm}$, and the demand signal, $R_{dmd}$, determine a trimmed demand signal, $R_{t,dmd}$, based on the trim signal, $C_{trm}$, and the demand signal, $R_{dmd}$, and output the trimmed demand signal, $R_{t,dmd}$, to control at least one component of engine 10. In other examples, the comparator is separate from adaptive control module 6 and receives the trim signal, $C_{trm}$, and the demand signal, $R_{dmd}$, determines a trimmed demand signal, $R_{t,dmd}$, based on the trim signal, $C_{trm}$, and the demand signal, $R_{dmd}$, and outputs the trimmed demand signal, $R_{t,dmd}$, to control at least one component of engine 10.

By simulating system-level performance and indicating adjustments to the demand signal, $R_{dmd}$, to engine 10 and actuators 12, performance adaptation control module 4 may increase the efficiency of engine 10, increase the performance of engine 10, or provide like improvements to engine performance targets.

Figure 5:
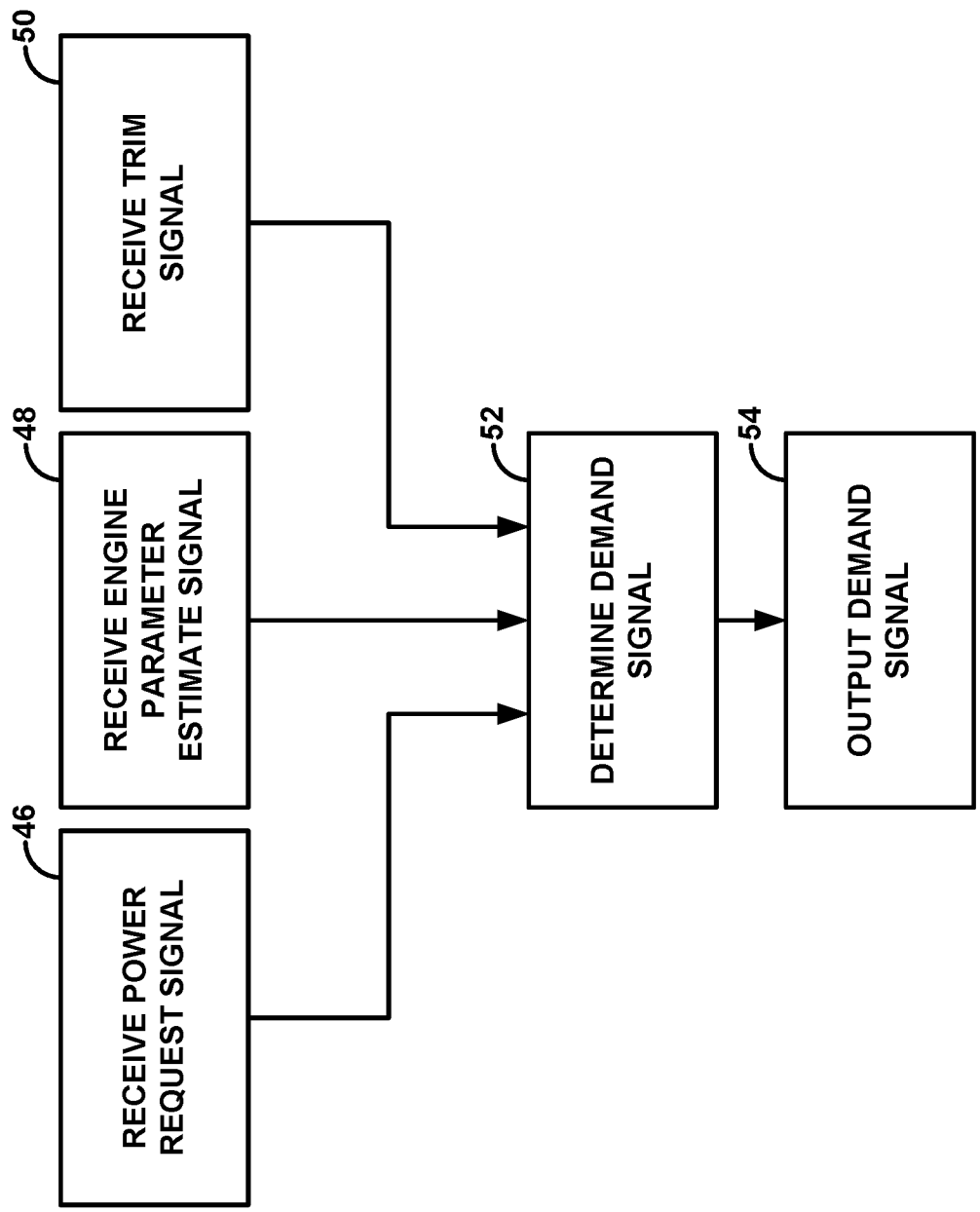
FIG. 5 is a flow diagram illustrating an example technique for controlling an engine.

The systems and modules of FIGS. 1-4 may be used for control of an engine. However, other control systems may be used to manage the engine. FIG. 5 is a flow diagram illustrating an example technique for managing power in an engine. FIG. 5 will be described with concurrent reference to FIG. 1; however, the technique of FIG. 5 may be used in a variety of control systems.

Adaptive control module 6 receives a power request signal, $P_{req}$ (46). The power request signal, $P_{req}$, may be a signal from, for example, a control system requesting a selected power demand for engine 10. Adaptive control module 6 also receives an engine parameter estimate signal, $X_{est}$, from real-time engine model module 8 (48). The engine parameter estimate signal, $X_{est}$, is generated by real-time engine model module 8 based on at least one feedback signal indicative of an operating parameter of an engine, such as an actuator signal, $X_{act}$, or an engine state trajectory signal, $X_{eng}$. In some examples, adaptive control module 6 may also receive a trim signal, $C_{trm}$, from performance adaptation control module 4 (50). The trim signal, $C_{trm}$, is based on a change in power demand, such as electrical demand, for engine 10. Adaptive control module 6 determines a demand signal, $R_{dmd}$, based on inputs including the power request signal, $P_{req}$, and the engine parameter estimate signal, $X_{est}$ (52). Adaptive control module 6 determines demand signal, $R_{dmd}$, using a set of control laws. In some examples, adaptive control module 6 may further determine the demand signal, $R_{dmd}$, based on the trim signal, $C_{trm}$. Adaptive control module 6 outputs the demand signal, $R_{dmd}$, for example to actuators 12 or loop select module 34 (FIG. 2), to control at least one component of engine 10 (54).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
   receiving, by a real-time engine model module, at least one feedback signal indicative of a measured operating parameter of an engine;
   determining, by the real-time engine model module, an engine parameter estimate signal based on the at least one feedback signal, wherein the engine parameter estimate signal represents an unmeasured operating parameter of the engine, different from the measured operating parameter of the engine;
   receiving, by an adaptive control module, a power request signal;
   receiving, by the adaptive control module, from the real-time engine model module, the engine parameter estimate signal;
   determining, by the adaptive control module, using a set of control laws, a demand signal based on inputs including the power request signal and the engine parameter estimate signal; and
   outputting, by the adaptive control module, the demand signal to control at least one component of the engine.

2. The method of claim 1, further comprising:
   receiving, by a comparator, from a performance adaptation control module, a trim signal, wherein the trim signal is based on an adaptation mode signal, a system state signal, and an iteration algorithm;
   receiving, by the comparator, the demand signal;
   determining, by the comparator, a trimmed demand signal based on the trim signal and the demand signal; and
   outputting, by the comparator, the trimmed demand signal to control at least one component of the engine.

3. The method of claim 2, further comprising:
   receiving, by the performance adaptation control module, the adaptation mode signal representing an adaptation mode according to which the iteration algorithm is configured;
   receiving, by the performance adaptation control module, the system state signal representing one or more propulsion or non-propulsion system components affecting at least one of power produced by the engine or power extracted from the engine; and
   determining, by the performance adaptation control module, the trim signal based on the adaptation mode signal and the system state signal.

4. The method of claim 3, wherein the performance adaptation control module comprises a steady-state detection module, the method further comprising:
   determining, by the steady-state detection module, based on the system state signal, whether the engine is operating in a steady state; and
   in response to determining that the engine is operating in the steady state, outputting, by the performance adaptation control module and to the comparator, the trim signal.

5. The method of claim 1, further comprising determining, by the real-time engine model module, using an adaptive engine model, the engine parameter estimate signal based on an actuator signal and an engine state trajectory signal representative of the measured operating parameter of the engine.

6. The method of claim 5, further comprising:
   tracking, by the real-time engine model module, the engine parameter estimate signal and the engine state trajectory signal; and
   updating, by the real-time engine model module, the adaptive engine model based on the tracked engine parameter estimate signal and the engine state trajectory signal.

7. The method of claim 1, wherein the adaptive control module comprises a schedule module, a closed-loop reference model module, an adaptation module, and a control module, the method further comprising:
   determining, by the schedule module, a demand setpoint based on the power request signal using a schedule;
   determining, by the closed-loop reference model module, a reference control signal based on the demand setpoint;

determining, by the adaptation module, an adaptation signal based on a difference between a reference parameter trajectory signal output by the closed-loop reference model module and an engine parameter estimate signal representing an unmeasured engine parameter; and determining, by the control module, the demand signal based on the reference control signal and the adaptation signal.

8. The method of claim 7, wherein the demand signal is a first demand signal, and further comprising:
receiving, by loop selection logic, the first demand signal, wherein the first demand signal represents one of steady-state, transient, and limit protection operation;
receiving, by the loop selection logic, a second demand signal, wherein the second demand signal represents another one of steady-state, transient, and limit protection operation;
selecting, by the loop selection logic, the first demand signal or the second demand signal; and
outputting, by the loop selection logic, the first demand signal or the second demand signal.

9. The method of claim 8, further comprising modifying at least one of the schedule, the demand setpoint, the set of control laws, and the loop selection logic based on an operational mode.

10. The method of claim 1, further comprising adapting the set of control laws based on the engine parameter estimate signal.

11. A system, comprising:
a real-time engine model module configured to:
receive at least one feedback signal indicative of a measured operating parameter of an engine;
determine an engine parameter estimate signal based on the at least one feedback signal indicative of the measured operating parameter of the engine, wherein the engine parameter estimate signal represents an unmeasured operating parameter of the engine, different from the measured operating parameter of the engine; and
an adaptive control module configured to:
receive a power request signal;
receive, from the real-time engine model module, the engine parameter estimate signal;
determine a demand signal based on the power request signal and the engine parameter estimate signal, wherein the adaptive control module is configured to determine the demand signal based on the power request signal and the engine parameter estimate signal using a set of control laws; and
output the demand signal to control at least one component of the engine.

12. The system of claim 11, further comprising a comparator configured to:
receive, from a performance adaptation control module, a trim signal, wherein the trim signal is based on an adaptation mode signal, a system state signal, and an iteration algorithm;
receive the demand signal;
determine a trimmed demand signal based on the trim signal and the demand signal; and
output the trimmed demand signal to control at least one component of the engine.

13. The system of claim 11, further comprising the performance adaptation control module configured to:

receive the adaptation mode signal representing an adaptation mode according to which the iteration algorithm is configured;
receive the system state signal representing one or more propulsion or non-propulsion system components affecting at least one of power produced by the engine or power extracted from the engine; and
determine the trim signal based on the adaptation mode signal and the system state signal.

14. The system of claim 13, wherein the performance adaptation control module further comprises a steady-state detection module configured to:
determine, based on the system state signal, whether the engine is operating in a steady-state; and
in response to determining that the engine is operating in the steady-state, cause the trim signal to be output to the comparator.

15. The system of claim 11, wherein the real-time engine model module is further configured to determine, using an adaptive engine model, the engine parameter estimate signal based on an actuator signal and an engine state trajectory signal representative of the measured operating parameter of the engine.

16. The system of claim 15, wherein the real-time engine model module is further configured to:
track the engine parameter estimate signal and the engine state trajectory signal; and
update the adaptive engine model based on the tracked engine parameter estimate signal and the engine state trajectory signal.

17. The system of claim 11, wherein the adaptive control module further comprises:
a schedule module configured to determine a demand setpoint based on the power request signal using a schedule;
a closed-loop reference model module configured to determine a reference control signal based on the demand setpoint and a reference parameter trajectory signal based on the reference control signal;
an adaptation module configured to determine an adaptation signal based on a difference between the reference parameter trajectory signal output by the closed-loop reference model module and the engine parameter estimate signal; and
a control module configured to determine the demand signal based on the adaptation signal and the reference control signal.

18. The system of claim 17, wherein the demand signal is a first demand signal and the adaptive control module further comprises loop selection logic configured to:
receive the first demand signal, wherein the first demand signal represents one of steady-state, transient, and limit protection operation;
receive a second demand signal, wherein the second demand signal represents another one of steady-state, transient, and limit protection operation;
select the first demand signal or the second demand signal; and
output the first demand signal or the second demand signal.

19. The system of claim 18, further comprising modifying at least one of the schedule, the demand setpoint, the set of control laws, and the loop selection logic based on an operational mode.

20. A computer-readable storage medium storing instructions that, when executed, cause a processor to:

receive, by a real-time engine model module, at least one feedback signal indicative of a measured operating parameter of an engine;

determine, by the real-time engine model module, an engine parameter estimate signal based on the at least one feedback signal indicative of a measured operating parameter of an engine, wherein the engine parameter estimate signal represents an unmeasured operating parameter of the engine, different from the measured operating parameter of the engine;

receive, by an adaptive control module, a power request signal;

receive, by the adaptive control module, from the real-time engine model module, the engine parameter estimate signal;

determine, by the adaptive control module, using a set of control laws, a demand signal based on the power request signal and the engine parameter estimate signal; and output, by the adaptive control module, the demand signal to control at least one component of the engine.

\* \* \* \* \*